United States Patent [19]

Flatz et al.

[11] Patent Number: 5,362,514
[45] Date of Patent: Nov. 8, 1994

[54] PROCESS FOR PRODUCING AN ANODE FOR ELECTROCHEMICAL CELLS

[75] Inventors: Josef Flatz, Waldmichelbach; Hermann W. Grünling, Hirschberg; Jörg Sopka, Schwetzingen, all of Germany

[73] Assignee: ABB Patent GmbH, Mannheim, Germany

[21] Appl. No.: 101,575

[22] Filed: Aug. 3, 1993

[30] Foreign Application Priority Data

Aug. 3, 1992 [DE] Germany ............................. 4225575

[51] Int. Cl.$^5$ ...................... B05D 5/12; H01M 6/36
[52] U.S. Cl. ..................................... 427/74; 427/190; 427/226; 427/245; 427/372.2; 429/111
[58] Field of Search ............... 429/111; 427/74, 190, 427/226, 245, 372.2, 374.1; 204/290 R, 291

[56] References Cited

U.S. PATENT DOCUMENTS

| | | | |
|---|---|---|---|
| 4,368,216 | 1/1983 | Manassen et al. | 427/74 |
| 4,534,099 | 8/1985 | Howe | 437/2 |
| 4,927,721 | 5/1990 | Gratzel et al. | 429/111 |

FOREIGN PATENT DOCUMENTS

| | | | |
|---|---|---|---|
| 0407182A2 | 1/1991 | European Pat. Off. | 429/111 |
| 91/16719 | 10/1991 | WIPO | 429/111 |

OTHER PUBLICATIONS

N. Vlachopoulos et al., "Surface Science", vol. 189/190, pp. 823–831 (1987).
V. H. Hoolding et al., "J.A.C.S.", vol. 105, pp. 5695–5696 (1983).
*Nature*, vol. 353, Oct. 24, 1991, pp. 737–740, "A low-cost high-eff. solar cell based on dye-sens."
*Bild der Wissenschaft*, vol. 7, Jul. 1992, pp. 30–33, "Eine völlig neuartige Solarzelle befl. die Photovolt."
Japenese Journal of Applied Physics, vol. 26, No. 5, pp. 782–783, Yoshino et al, "Electrochronic Properties of $V_2O_5$ Thin Films Colloid–Chemac, Dep."
J. Electrochem Soc. vol. 134, No. 5, May 1987, pp. 1148–1152, Perrier et al. "PcAlOH Photoelectrochemical Cells".
J. Chem. Phys. vol. 71, No. 3, Aug. 1979, pp. 1211–1217, Loutfy et al, "Photovoltaic Properties of Metal-Free Phthalocyanines."
Regulars Research Notes, Feb. 1992, 1 page "Cheaper Solar Cells Mimic Nature".
*Electronik*, Feb. 1991, p. 30, Hubner et al, Jan. 1991 "Solar Cells for Cloudy Weather".

*Primary Examiner*—Aaron Weisstuch
*Attorney, Agent, or Firm*—Herbert L. Lerner; Laurence A. Greenberg

[57] ABSTRACT

A process is provided for producing an anode for an electrochemical cell, in particular a solar cell, on electrically conductive glass to which a layer of porous metal oxide is applied. The layer includes metal complexes of the porphyrin-phthalocyanine class and other dyestuffs and is then subjected to a heat treatment. A paste of highly dispersed metal oxide, in particular aluminum oxide and/or titanium oxide, is first produced with the addition of a dyestuff and an alcoholic solution, which acts as a binder, in a dry atmosphere. The paste produced in this way is applied as a thin layer to the glass plate coated with a transparent, electrically conductive layer, and the configuration including the glass plate and the pasty metal oxide layer is subjected to a heat treatment at temperatures below 300° C.

12 Claims, No Drawings

PROCESS FOR PRODUCING AN ANODE FOR ELECTROCHEMICAL CELLS

BACKGROUND OF THE INVENTION

Field of the Invention:

The invention relates to a process for producing an anode for electrochemical cells, in particular for solar cells, on conductive glass to which a layer of titanium dioxide is applied, the layer is then impregnated with metal complexes of the porphyrin-phthalocyanine class and/or other dyestuffs and then subjected to a heat treatment.

Published European Application No. 0 333 641 A1 (corresponding to U.S. Pat. No. 4,927,721) discloses a process for producing a polycrystalline metal oxide semiconductor layer by the sol-gel method for a photoelectrochemical cell, wherein a titanium substrate made of pure titanium is first cleaned in boiling hydrochloric acid. A drop of a titanium ethoxide solution diluted with very pure methanol is applied to the substrate and then the titanium alkoxide is hydrolyzed at room temperature. Subsequently, the substrate with the hydrolyzed layer is heated for a short time at approximately 450° C. That process is repeated several times. After it has been repeated 10 to 15 times, the titanium dioxide layer has reached about 20 μm thickness. The substrate with the layer is then heat-treated at about 500° C. in a pure argon atmosphere. A chromophore or dyestuff is then applied by immersing the substrate with the oxide layer in an aqueous solution of the particular dyestuff carrier for about 1 hour.

In carrying out the known process it is essential to exactly adhere to the specified, numerous parameters of the method, such as concentration, temperature, and duration, in order to achieve the desired result. In particular, according to the known process, the heat treatment of the titanium dioxide layer at 450° to 500° C. is necessary to consolidate the titanium dioxide layer. However, since the necessary dyestuffs are destroyed above 300° C., according to the known process, the color is applied to the titanium dioxide layer at a low temperature, preferably room temperature. In that case, the dyestuff molecules are held on the surface of the titanium dioxide layer only by adsorptive mechanisms.

As is evident from the process cycle explained above, the known process for producing photoelectrochemical cells, in particular for use as solar cells, requires a considerable expenditure. In particular, the long time requirement for the preparation of the titanium substrate for the formation of a titanium dioxide layer makes the known process unattractive for an economic application since the costs to be expended thereon are disproportionate to the achievable result.

SUMMARY OF THE INVENTION

It is accordingly an object of the invention to provide a process for producing an anode for a photoelectrochemical cell, in particular a solar cell, which overcomes the hereinafore-mentioned disadvantages of the heretofore-known methods of this general type and which permits the best possible results with lower expenditures being necessary.

With the foregoing and other objects in view there is provided, in accordance with the invention, in a process for producing an anode for an electrochemical cell, in particular a solar cell, on conductive glass to which a layer of porous metal oxide is applied, the layer being acted on by metal complexes of the porphyrin-phthalocyanine class and/or other dyestuffs and then subjected to a heat treatment, the improvement which comprises preparing a paste of highly dispersed metal oxide with the addition of a dyestuff and an alcohol solution acting as a binder, in a dry atmosphere; applying the prepared paste as a thin layer to the glass plate coated with a transparent, electrically conducting layer; and heat treating a configuration formed of the electrically conductive glass plate and the pasty metal oxide layer at temperatures below 300° C.

According to the invention, a paste of highly dispersed oxide, a chromophore, and an alcohol solution acting as a binder is produced in a first process step. A dry atmosphere must be ensured during the paste production. In a second process step, the paste produced in this way is applied to a glass plate provided with an electrically conductive, transparent layer. In a third process step, this pasty layer is subjected to a heat treatment in which the temperatures do not exceed 300° C. In this process, the heat treatment is by slow heating under vacuum in order to avoid undesirable reactions and alterations.

In accordance with another mode of the invention, there is provided a process which comprises preparing the highly dispersed metal oxide paste from aluminum oxide and/or titanium oxide. As in the known process, metal complexes of the porphyrin-phthalocyanine class are again provided in this case as chromophotos or dyestuffs. The solution acting as a binder is preferably based on the use of metal alcoholates and/or metal esters together with solvents.

In accordance with a further mode of the invention, n grams of highly dispersed $TiO_2$ powder is mixed with n · $10^{-3}$ grams of phthalocyanine-cobalt(II) complex with the addition of 7 · n milliliters of solution and homogenized, preferably in a ball mill.

The solution is composed of two parts of ethyl acetate and one part of glycerol, with an addition of 0.1 to 2% titanium(IV) ethylate, based on the amount of $TiO_2$ powder. The paste prepared in this way is then applied to the glass plate in a thickness of 30 μm by the screen printing process and then subjected to a heat treatment for approximately 1 hour at 140° C. The layer resulting from this process is crack-free and exhibits good adhesion and good physico-chemical activity as an anode.

In accordance with an added mode of the invention, n grams of titanium dioxide powder are likewise mixed with 0.5 n milligrams of octaethyl-porphyrin-ruthenium(II) with the addition of 6.5 n milliliters of solution and homogenized in a three-cylinder mill.

In accordance with a concomitant mode of the invention, the solution used in this case is composed of two parts of ethyl acetate, one part of ethylene glycol dimethyl ether, and one part of glycerol with an addition of 0.2 to 3% of titanium isopropylate, based on the amount of the $TiO_2$ powder. This paste is also applied to the glass plate in the same thickness of about 30 μm using the screen printing process and is then subjected to a heat treatment for approximately 1 hour at 130° C.

In the two versions of the process according to the invention which have been explained by way of example, the heat treatment is carried out with slow heating and cooling.

Other features which are considered as characteristic for the invention are set forth in the appended claims.

Although the invention is illustrated and described herein as embodied in a process for producing an anode for a photoelectrochemical cell, in particular a solar cell, it is nevertheless not intended to be limited to the details shown: since various modifications and structural changes may be made therein without departing from the spirit of the invention and within the scope and range of equivalents of the claims.

The construction and method of operation of the invention, however, together with additional objects and advantages thereof will be best understood from the foregoing description of specific embodiments.

We claim:

1. A process for producing an anode for an electrochemical cell, comprising a conductive glass substrate on which a layer of porous metal oxide is applied, which comprises:
    (1) preparing, in a dry atmosphere, a paste of highly dispersed said metal oxide with the addition of at least one dyestuff and an alcohol solution acting as a binder;
    (2) applying the prepared paste as a thin layer to the glass plate previously coated with a transparent, electrically conducting layer; and
    (3) heat treating the electrically conductive glass plate with the pasty metal oxide layer coated thereon at temperatures below 300° C.

2. The process according to claim 1, which comprises preparing the metal oxide paste from at least one material selected from the group consisting of aluminum oxide and titanium oxide.

3. The process according to claim 1, which comprises blending n grams of highly dispersed titanium dioxide powder with $n \cdot 10^{-3}$ grams of phthalocyanine-cobalt-(II) complex, mixing the blend with an addition of 7 n milliliters of ethyl acetate/glycerol solution and homogenizing, applying the mixture to the conductive glass, and then hardening the mixture at 140° C.

4. The process according to claim 3, which comprises homogenizing the mixture in a ball mill.

5. The process according to claim 3, which comprises applying the mixture to the conductive glass with a screen printing process.

6. The process according to claim 3, which comprises applying the mixture to the conductive glass in a layer thickness of 30 μm.

7. The process according to claim 3, which comprises forming the ethyl acetate/glycerol solution from two parts of ethyl acetate and one part of glycerol with an addition of $\leq 2\%$ titanium(IV) ethylate, based on the amount of titanium dioxide powder.

8. The process according to claim 1, which comprises blending n grams of titanium dioxide powder with 0.5 n milligrams of octaethyl-porphyrin-ruthenium(II), mixing the blend with an addition of 6.5 n milliliters of ethyl acetate/ethylene glycol dimethyl ether/glycerol solution and homogenizing, applying the homogenized mixture to the conductive glass, and then heat-treating the mixture at 130° C.

9. The process according to claim 8, which comprises homogenizing the mixture in a three-cylinder mill.

10. The process according to claim 8, which comprises applying the mixture to the conductive glass with a screen printing process.

11. The process according to claim 8, which comprises applying the mixture to the conductive glass in a layer thickness of 30 μm.

12. The process according to claim 8, which comprises forming the ethyl acetate/ethylene glycol dimethyl ether/glycerol solution in a ratio of 2:1:1 with an addition of $\leq 3\%$ titanium isopropylate, based on the amount of titanium dioxide powder.

* * * * *